H. H. HICKS.
METHOD AND APPARATUS FOR BLEACHING GRAIN.
APPLICATION FILED MAY 6, 1918.
1,324,048.
Patented Dec. 9, 1919.
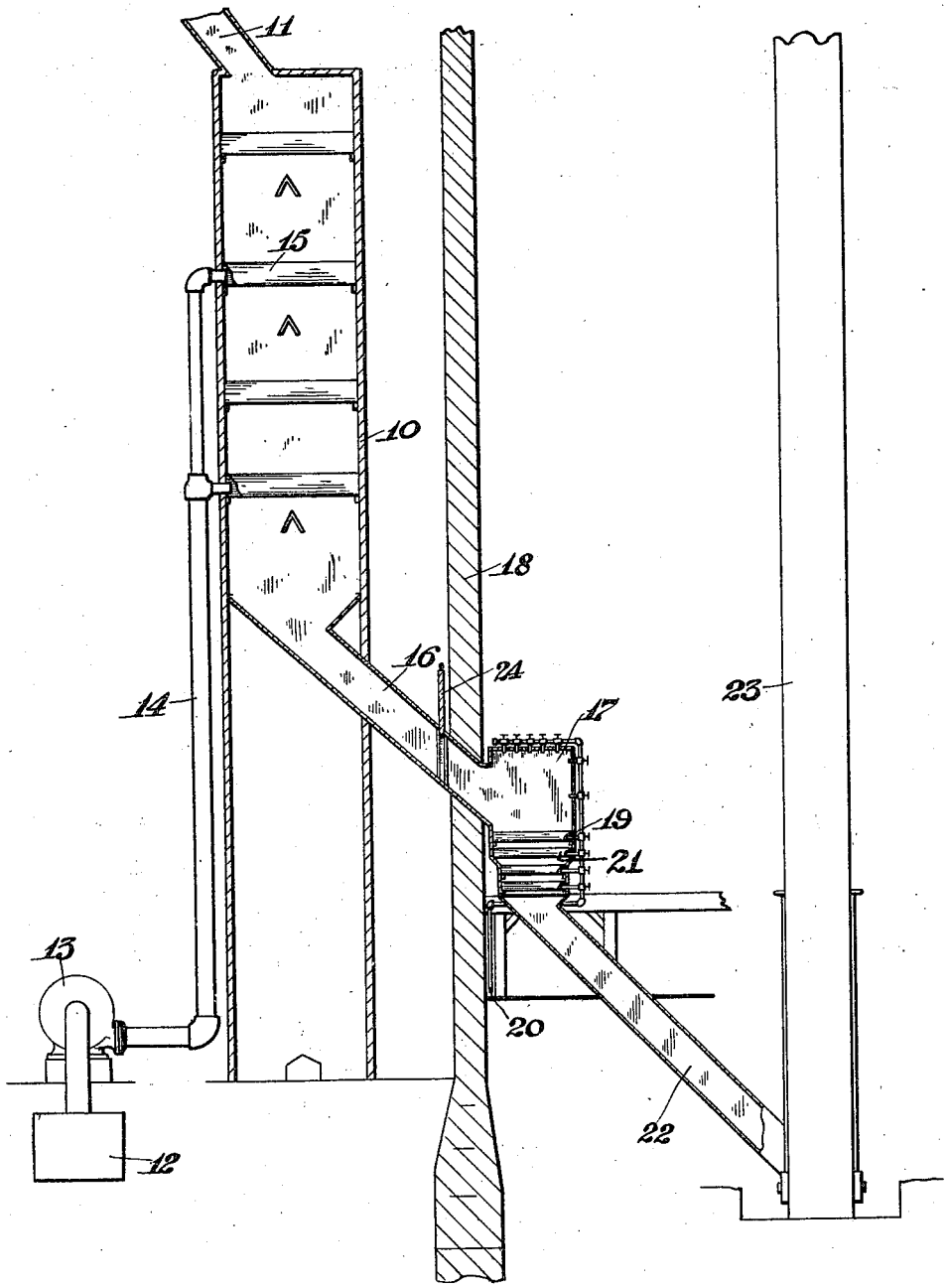

UNITED STATES PATENT OFFICE.

HAROLD H. HICKS, OF MILWAUKEE, WISCONSIN, ASSIGNOR TO DONAHUE-STRATTON COMPANY, OF MILWAUKEE, WISCONSIN, A CORPORATION OF WISCONSIN.

METHOD AND APPARATUS FOR BLEACHING GRAIN.

1,324,048.  Specification of Letters Patent.  Patented Dec. 9, 1919.

Application filed May 6, 1918. Serial No. 232,888.

*To all whom it may concern:*

Be it known that I, HAROLD H. HICKS, a citizen of the United States, and resident of Milwaukee, in the county of Milwaukee and State of Wisconsin, have invented new and useful Improvements in Methods and Apparatus for Bleaching Grain, of which the following is a description, reference being had to the accompanying drawings, which are a part of this specification.

This invention has for its object to provide for expediting the operation of bleaching oats and other grain. Heretofore the bleaching of grain to remove impurities and foreign matter such as stains, mold, dust smut and bacteria has been accomplished by subjecting it to the action of the fumes of burning sulfur in the presence of steam as the grain descends through a stack, the steam as well as the sulfur fumes being admitted to the stack. I have found that better and quicker results may be obtained by confining the treatment in the stack to the action of the sulfur fumes alone, and subjecting the grain to a subsequent treatment with steam after it has left the stack.

With the above in view the invention consists in the method and means for bleaching grain as herein claimed and all equivalents.

Referring to the accompanying drawing, the view represents a sectional elevation of a grain bleacher constructed in accordance with this invention.

In this drawing 10 indicates a stack to which grain is admitted at its upper end through a feed tube 11. Sulfur fumes from a sulfur burner 12 are forced by a blower 13 through pipes 14 into the mass of descending grain in the stack and are evenly distributed through the mass by suitable hoods 15 as usual. Steam is not admitted to the stack, but the discharge spout 16 conducting the grain from the stack delivers it to a steam chamber 17 preferably on the outside of the bleacher wall 18 where it is accessible to the operator and where the grain is quickly and thoroughly subjected to the action of steam from numerous valve-controlled steam nozzles 19 supplied with live steam from a steam pipe 20. The steam is distributed through the moving grain by the nozzles discharging through hoods 21, though the nozzles at the upper portion of the steam chamber 17 open directly into said chamber without distributing hoods, for they are not in position to be covered by the grain.

The discharge spout 22 from the bottom of the steam chamber 17 leads to an elevator leg 23.

In operation the treatment of the grain in the stack by means of the sulfur fumes only, enables the sulfur fumes to more thoroughly penetrate the entire moving mass of grain than when its progress is impeded by water of condensation which is present when steam is admitted to the stack. The sulfur gas has full opportunity for extending throughout the mass of grain so as to be equally effective in its action on all parts thereof when the latter is subjected to the steam treatment in the steam chamber 17. The sulfur fumes pass down through the stack with the grain and out through the spout 16 into the steam chamber 17 where the steam action may be regulated to the desired extent to coöperate therewith without introducing more moisture than is necessary for the bleaching action. The grain is immediately conducted to the elevator after leaving the steam chamber and is taken to bins where it lies until the chemical action is completed.

Because of the steam being quickly and evenly distributed throughout the body of grain in the steam chamber, the grain is not overheated to impair its germinating properties.

Furthermore, the bleaching operation may best be performed when the sulfur gases are cool and the introduction of steam in a separate chamber allows the gases to become cool in the stack by their contact with the cool grain before being subjected to the heat of the steam in the steam chamber.

By confining the steam action to a separate steam chamber it is possible to cut off communication between the stack and the steam chamber as by means of a valve 24, so that the steam chamber may be made quickly accessible for cleaning when desired. As previously stated, the steam is not admitted to the stack and during the process the grain flows down through the conduit 16 from the stack to the steam chamber in a continuous stream. The valve 24 is not a means for preventing the steam from entering the stack during the bleaching operation as the flowing grain itself prevents entrance of steam to the stack.

In accordance with the provisions of the patent statues, I have described the principle of operation of my invention, together with the apparatus which I now consider to represent the best embodiment thereof; but I desire to have it understood that the apparatus shown is only illustrative, and that the invention can be carried out by other means within the scope of my claims.

What I claim as new and desire to secure by Letters Patent is:

1. A grain bleacher, comprising a stack having means for treating the grain during its passage therethrough with sulfur fumes without moisture, a steam chamber distinct from the stack, and a grain conduit connecting said chamber with the stack, the grain within the conduit preventing the steam entering the stack.

2. A grain bleacher, comprising a stack having means for treating the grain passing therethrough with sulfur fumes without moisture, a steam chamber, and means for transferring the gas charged grain from the stack to the chamber and preventing the steam entering the stack.

3. A grain bleacher, comprising a stack having means for treating the grain passing therethrough with sulfur fumes without moisture, a steam chamber distinct from the stack, and a conduit connecting the stack with the chamber and separating the two to such an extent as to prevent the steam reaching the grain in the main stack.

4. A grain bleacher, comprising a stack having means for treating the grain with sulfur fumes without moisture, a steam chamber distinct from the stack, and a downwardly inclined grain conduit connecting said chamber with the stack and of much less cross-sectional area than the stack, so that the grain within the conduit prevents the steam entering the stack.

5. The method of bleaching grain which consists in permeating a mass of grain with fumes of burning sulfur without introducing moisture, and afterward separately adding moisture thereto.

6. The method of bleaching grain which consists in charging a mass of grain with sulfur gas without introducing moisture, and then subjecting the gas charged grain to the action of steam.

7. The method of bleaching grain which consists in conducting the grain through a sulfur gas chamber and then through a steam chamber.

8. The method of bleaching grain which consists in charging the space in a mass of grain with sulfur fumes and then conducting said charged mass of grain through a steam chamber.

9. The method of bleaching grain which consists in charging a moving mass of grain with sulfur gas, then subjecting it to the action of steam, and then drying and cooling it.

In testimony whereof, I affix my signature, in presence of two witnesses.

HAROLD H. HICKS.

Witnesses:
R. S. C. CALDWELL,
H. D. CHASE.